United States Patent
Kothari et al.

(10) Patent No.: US 11,752,525 B2
(45) Date of Patent: Sep. 12, 2023

(54) SYSTEM AND METHOD OF LAUNDRY SORTING

(71) Applicant: Mihir Kothari, Niles, IL (US)

(72) Inventors: Mihir Kothari, Niles, IL (US); Michael Infanger, Park Ridge, IL (US)

(73) Assignee: Mihir Kothari, Niles, IL (US)

( * ) Notice: Subject to any disclaimer, the term of this patent is extended or adjusted under 35 U.S.C. 154(b) by 0 days.

(21) Appl. No.: 17/866,252

(22) Filed: Jul. 15, 2022

(65) Prior Publication Data
US 2023/0028431 A1    Jan. 26, 2023

Related U.S. Application Data

(60) Provisional application No. 63/222,775, filed on Jul. 16, 2021.

(51) Int. Cl.
| | |
|---|---|
| *B07C 5/342* | (2006.01) |
| *B25J 19/02* | (2006.01) |
| *B25J 11/00* | (2006.01) |
| *B25J 15/00* | (2006.01) |

(52) U.S. Cl.
CPC ............ *B07C 5/342* (2013.01); *B25J 11/008* (2013.01); *B25J 15/0019* (2013.01); *B25J 19/023* (2013.01)

(58) Field of Classification Search
CPC ... B07C 5/342; B07C 5/16; B07C 2501/0063; Y10S 209/937; B25J 11/08; B25J 15/0019; B25J 19/023
USPC .................................................. 209/44.1, 937
See application file for complete search history.

(56) References Cited

U.S. PATENT DOCUMENTS

| | | | |
|---|---|---|---|
| 9,230,329 B2 | 1/2016 | Lukka | |
| 9,908,152 B2 | 3/2018 | Sielermann et al. | |
| 9,920,470 B2 | 3/2018 | Tautz et al. | |
| 9,988,220 B2 | 6/2018 | Sielermann et al. | |
| 2013/0168300 A1* | 7/2013 | Malone | B07C 5/3412 209/552 |
| 2019/0184554 A1 | 6/2019 | Yamazaki et al. | |
| 2019/0345664 A1 | 11/2019 | Bringewatt et al. | |
| 2020/0224359 A1 | 7/2020 | Bringewatt et al. | |

* cited by examiner

*Primary Examiner* — Michael McCullough
*Assistant Examiner* — Jessica L Burkman
(74) *Attorney, Agent, or Firm* — Andrus Intellectual Property Law, LLP (57) ABSTRACT

A laundry sorting and evaluation system includes a housing having an opening and defining a laundry path. First and second platforms are positioned within the housing, each operably connected to a motor. First and second cameras are respectively associated with the platforms and are configured to acquire at images of an item of laundry on each of the first and second platforms. A controller is configured to receive the images and produce an evaluation of a condition of the item of laundry based upon the received images.

20 Claims, 6 Drawing Sheets

SYSTEM AND METHOD OF LAUNDRY SORTING

CROSS-REFERENCE TO RELATED APPLICATIONS

This application claims priority of U.S. Provisional Patent Application No. 63/222,775, filed on Jul. 16, 2021 and which is incorporated by reference herein in its entirety.

BACKGROUND

The present disclosure relates to the field of laundry. More specifically, the present disclosure relates to the automated evaluation and sorting of laundry.

Automated laundry systems provide for the cost-effective and ecologically efficient cleaning of soiled laundry. Food, beverage, and hospitality industries, as well as medical and dental fields, require the frequent washing of large volumes of laundry.

U.S. Pat. No. 9,908,152 discloses a method for sorting laundry items, in particular dirty laundry items. U.S. Pat. No. 9,920,470 discloses a method for capturing an item of laundry. U.S. Pat. No. 9,988,220 discloses a method and apparatus for feeding items of laundry to a mangle or another laundry-treatment arrangement. U.S. Pat. No. 9,230,329 discloses a method, computer program, and apparatus for determining a gripping location. Each of these are incorporated by reference herein in their entireties.

BRIEF DISCLOSURE

In an example of a laundry sorting and evaluation system, the system includes a housing that defines a laundry path. A first platform is located within the housing. The first platform is operably connected to a first motor. The first motor is operable to move the first platform between a supportive position and at least one dispositive position. A first camera is associated with the first platform and is configured to acquire at least one image of an item of laundry on the first platform. A second platform is located within the housing. The second platform is operably connected to a second motor. The second motor is operable to move the second platform between a supportive position and at least one dispositive position. A second camera is associated with the second platform and is configured to acquire at least one image of the item of laundry on the second platform. A controller is configured to receive the at least one image from the first camera and the at least one image from the second camera and to produce an evaluation of a condition of the item of laundry.

In another example of a laundry sorting and evaluation system, the system includes a housing having an opening and defining a laundry path. A first platform is within the housing. The first platform is operably connected to a first motor. The first motor is configured to move the first platform between a supportive position and at least one dispositive position. A first camera is associated with the first platform and configured to acquire at least one first image of an item of laundry on the first platform in the supportive position. A second platform is within the housing. The second platform is below the first platform. The second platform is operably connected to a second motor. The second motor is configured to move the second platform between a supportive position and at least one dispositive position. A second camera is associated with the second platform and configured to acquire at least one second image of the item of laundry on the second platform in the supportive position. A controller is configured to receive the at least one image from the first camera and the at least one image from the second camera. The controller is configured to produce an evaluation of a condition of the item of laundry based upon the at least one first image and the at least one second image.

In a further example of a laundry sorting and evaluation system, the system includes a housing having an opening and defining a laundry path. A load cell is within the housing and configured to weigh the item of laundry. A first platform is within the housing. The first platform is operably connected to a first motor. The first motor is configured to move the first platform between a supportive position and at least one dispositive position. A first camera is associated with the first platform. The first camera is configured to acquire at least one first image of an item of laundry on the first platform in the supportive position. A second platform is within the housing. The second platform is below the first platform. The second platform is operably connected to a second motor. The second motor is configured to move the second platform between a supportive position and at least one dispositive position. A second camera is associated with the second platform. The second camera is configured to acquire at least one second image of the item of laundry on the second platform in the supportive position. A controller is configured to receive the at least one first image from the first camera, the at least one second image from the second camera, and a weight from the load cell. The controller is configured to produce an evaluation of the condition of the laundry based upon the at least one first image the at least one second image, and the weight. If the evaluation is an acceptable condition, the controller is configured to operate the second motor to move the second platform to the first dispositive position. If the evaluation is an unacceptable condition, the controller is configured to operate the second motor to move the second platform to the second dispositive position.

Examples of the laundry evaluation and sorting system may further include a robotic singulator. The robotic singulator may include an articulable robotic arm. The articulable robotic arm may have an end effector at the end of the robotic arm. The end effector is configured to grasp an item of laundry. A singulator camera is positioned in proximity to the end effector and is configured to obtain at least one laundry image. A singulator controller is configured to receive the at least one laundry image, create a point-cloud from the at least one image, select a peak of the point-cloud in reference to a reference point, and control the end effector to the peak of the point-cloud to grasp the item of laundry.

In an example of a method of evaluating and sorting an item of laundry, a first camera acquires at least one first image of an item of laundry supported on a first platform in a supportive position. A controller receives the at least one first image from the first camera. The controller operates a first motor to move the first platform to a dispositive position. A second camera acquires at least one second image of the item of laundry supported on a second platform in a supportive position. The controller receives the at least one second image from the second camera. The controller operates to produce an evaluation of the condition of the laundry based upon the at least on first image and the at least one second image. Based upon the evaluation by the controller, the controller operates a second motor to move the second platform to a first dispositive position or a second dispositive position.

In further examples of the method, the controller may receive a weight of the item of laundry from a load cell positioned relative to the first platform. The controller may operate to produce the evaluation of the condition of the laundry further based upon the received weight. The method may further include illuminating the item of laundry on the first platform and illuminating the item of laundry on the second platform. In still further examples of the method, the controller operates to identify the item of laundry.

DETAILED DISCLOSURE

Currently available washing systems can clean, dry, and even fold pieces of laundry. Customer-facing laundry items, including but not limited to, towels, sheets, robes, napkins, tablecloths, or scrubs, must also meet functional and aesthetic specifications or be replaced. Discoloration, fraying, or tearing may all be reasons that a piece of laundry is no longer acceptable for commercial use. Systems and methods for the evaluation and sorting of laundry based upon functional and aesthetic qualities are disclosed herein.

In an automated laundry system and process, articles of laundry are cleaned as a batch of like items and/or colors. The washed items are dried, for example with the use of a mangle, which wrings water from the washed laundry. Particularly in the cleaning of commercial laundry, the laundry is then bagged for delivery to the customer. However, as previously noted, customer-facing laundry must meet quality standards, particularly, but not limited to those in the food, beverage, and hospitality industries. Specifically, customers in those industries desire laundry that is free from discoloration or visible signs of wear or damage.

Figure 1:
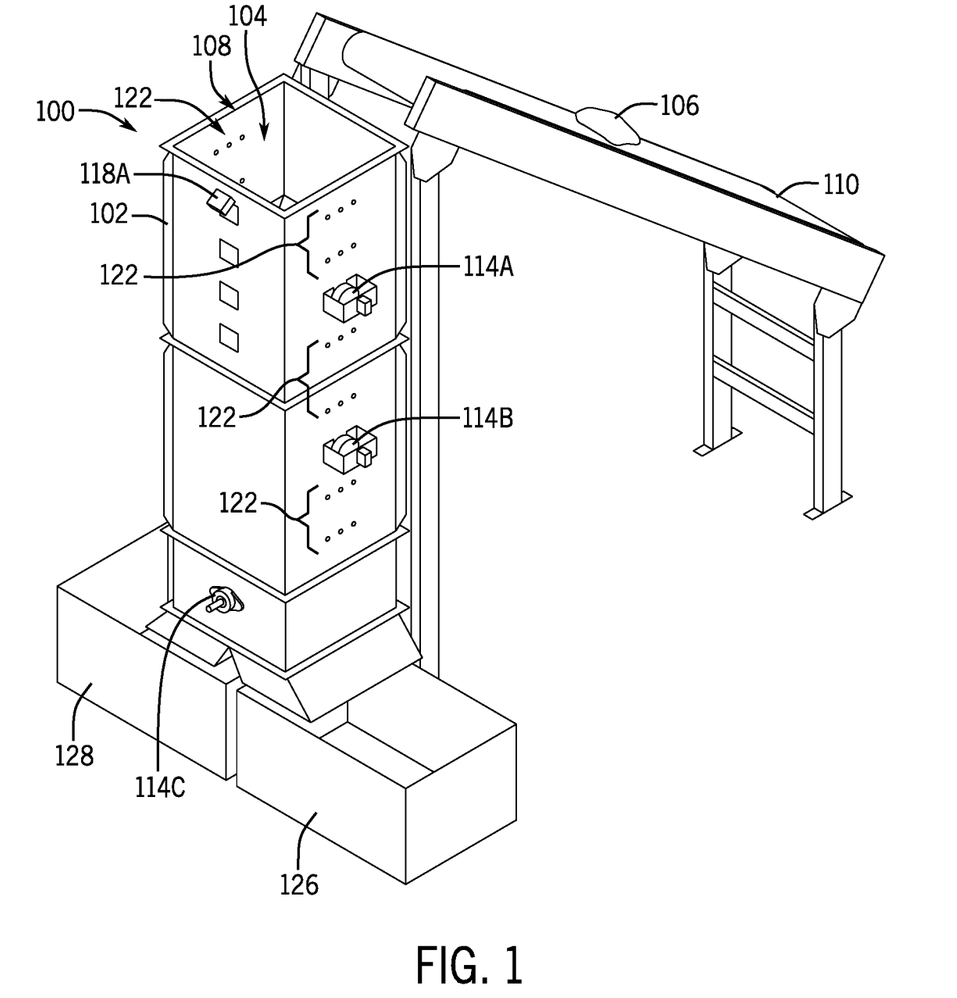
FIG. 1 is an isometric view of an example of a system for sorting and evaluating laundry.

A sorting apparatus is disclosed herein and depicted in FIG. 1 that evaluates each piece of laundry and determines if the laundry meets the predetermined quality standards and should be prepared for delivery to the customer or if the piece of laundry fails to meet these standards and should be segregated for disposal. FIG. 1 presents an example of a system 100 for the evaluation and categorization of laundry. The system 100 includes a hollow housing 102 which is, for example, constructed of sheet metal or plastic. The housing 102 defines a laundry path 104 through which laundry travels for example by force of gravity. Individual items of laundry 106 are lifted to the opening 108 of the housing 102, for example by a conveyor 110. In other examples, the items of laundry may be brought to the opening 108 by a robotic or driven end effector. One example of a robotic singulator which may be used in connection with examples of the system 100 as described herein is shown in and further described with respect to FIGS. 5 and 6. In still further examples, the system 100 may be arranged at a position below the outlet of a preceding piece of laundry equipment, for example, a mangle. In examples, the item of laundry 106 may be bunched or may have previously been pressed or flattened.

Figure 2:
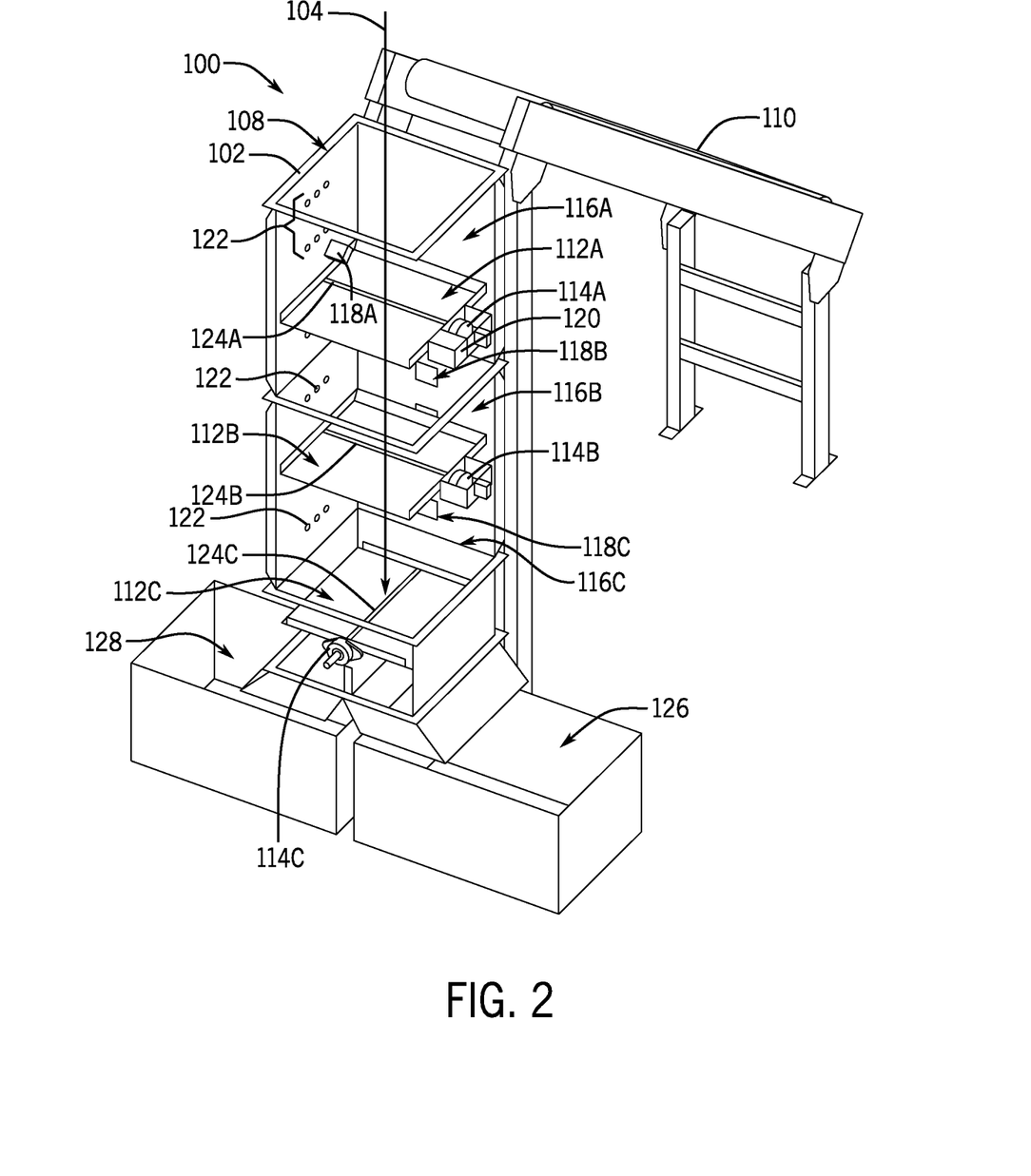
FIG. 2 is a front isometric view of an example of the system for sorting and evaluating laundry with a portion of the housing removed to depict the components therein.

FIG. 2 is a front isometric view of the system 100 with a portion of the housing 102 removed to better depict the components therein. The system 100 includes a plurality of platforms 112A-C located within the housing 102. Each platform 112A-C defines an evaluation zone 116A-C within the housing 102 along the laundry path 104. Each of the platforms 112A-C are pivotably mounted within the housing 102 and operable by a motor 114A-C to rotate about a shaft 130A-C between at least a supportive position and at least one dispositive position. The supportive position of each of the platforms 112A-C has the platform 112 extend across the laundry path 104 within the housing 102 to receive a piece of laundry thereon and hold the piece of laundry in a respective evaluation zone 116A-C for the evaluation described herein. The at least one dispositive position of each of the platforms 112A-C is at least an angle at which the force of gravity overcomes the friction between the piece of laundry and the platform 112 such that the piece of laundry slides and/or falls from the platform 112 down the laundry path 104. In one example, the at least one dispositive position may include a 90° angle or a 120° angle from the supportive position. In other examples, the at least one dispositive position may be an angle calculated based upon a coefficient of friction between the platform and expected frictional qualities of the piece of laundry, including, but not limited to an expected water content of the piece of laundry during evaluation. In examples, as provided herein, the platform 112 may reciprocate between the at least one dispositive position and the supportive position (e.g. between a 90° angle and a 0° angle). While in other examples, the platform 112 may rotate 180° for each piece of laundry or 360° for each piece of laundry to ensure that the at least one dispositive position is reached and to return the platform 112 to the supportive position.

In an example, the item of laundry enters the opening 108, falling to the first platform 112A. FIG. 2 depicts the platforms 112 in the supportive positions. The fall of the item of laundry through the opening 108 to the first platform 112A may help to spread the item of laundry out when it comes to rest on the platform 112A. Each platform 112A-C defines an evaluation zone 116A-C within the housing 102. Each evaluation zone 116A-C includes a camera 118A-C. The cameras 118A-C operate to acquire at least one image of the item of laundry on the respective platforms 112A-C. The cameras 118A-C communicate the acquired images to a controller 200, described in further detail with respect to FIG. 4. The controller processes the received images and operates the system based at least in part upon the processed images. Images from the camera 118A are exemplarily evaluated by the controller 200 to confirms that an item of laundry is located on the platform 112A. This confirmation may further include a confirmation that the item of laundry located on the platform 112A is the type of laundry item expected for processing. For example, if the system 100 is configured for processing a batch of laundry made up entirely of towels, the confirmation includes confirmation that the item of laundry located on the platform 112A is a towel. Such evaluation may be performed in the manners as described herein. In another example, the system 100 may be configured to evaluate a batch of mixed laundry items. In such example, the confirmation that an item of laundry is located on the platform 112A may include an identification of the type of laundry item (e.g. towel, washcloth, table cloth, pillow case, etc.). Upon such identification, the controller 200 may operate to select the algorithms, models, and/or criteria upon which further evaluation of that item of laundry is evaluated within the system 100.

Figure 3:
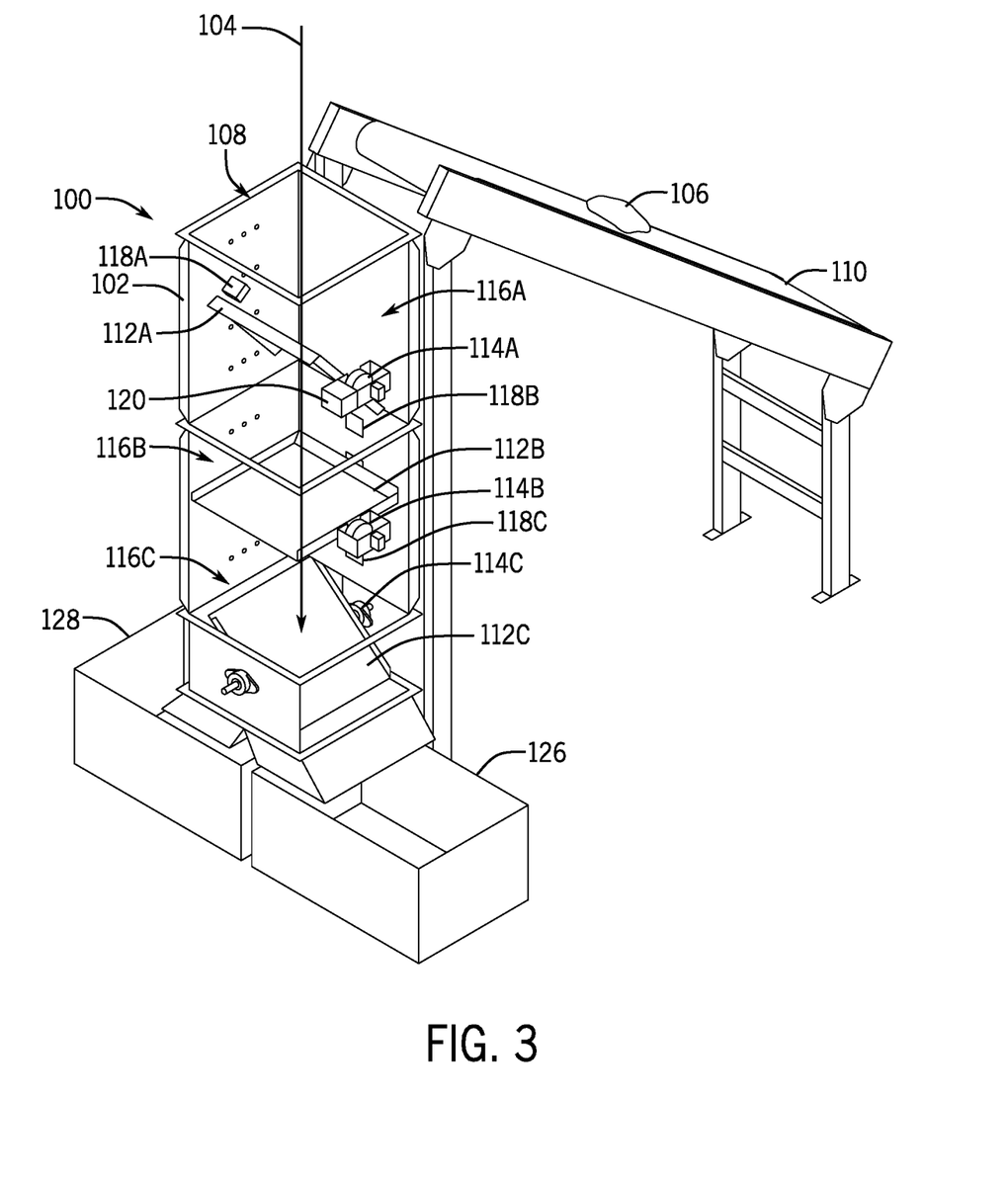
FIG. 3 is an isometric view of the example of the system for sorting and evaluating laundry with the portion of the housing removed to depict the components therein.

The platform 112A further includes a load cell 120. Once an item of laundry is confirmed on the platform 112A, the load cell 120 operates to weigh the item of laundry. In an example, the quality of the item of laundry may be evaluated based at least in part upon the weight of the item of laundry. In an example, a minimum threshold weight for a particular item of laundry may be defined (e.g. 65 g). The weight of the item of laundry may be a measure of degradation, wear, or integrity of the item of laundry. For example, loss of pile, fraying, or holes in an item of laundry may be detected in a reduction of weight from an expected value. In a non-limiting example, towel or washcloth material may exemplarily range between 400-700 $g/m^2$. Specific laundry items may thus have an expected weight or an acceptable weight range defined for the item. In additional examples, particular kinds or styles of items within an item type may have a specified expected or acceptable weight range. In another example, the nominal or full weight of the item of laundry may be predefined and a minimum acceptable weight is a predetermined percentage of the nominal or full item weight. After the item of laundry is weighed, the motor 114A is operated to move the platform 112A from the supportive position to the dispositive position. FIG. 3 depicts platform 112A and platform 112C in examples of dispositive positions. Once the platform 112A is rotated to or through a dispositive position, for the item of laundry, the item of laundry will slide or fall off of the platform 112A and into the evaluation zone 116B, falling on the platform 112B. In a further example, the platform 112A rotates 180° or 360° to drop the item of laundry off of the platform 112A. This may also impart a rotational moment on the item of laundry, which causes the item of laundry to reverse sides and spread out on the platform 112B.

In the evaluation zone 116B, the camera 118B acquires at least one image of the item of laundry and provides the at least one image to the controller 200. The image of the item is processed by the controller 200 to evaluate the color of the item of laundry and a condition of the item of laundry. In examples, the controller 200 may be configured with the identification and specifications of the item of laundry to be evaluated, along with the color and condition ranges and definitions. In other examples, the previous identification of the item of laundry noted above is used to select the specifications of color and condition ranges and definitions.

In an example, the acceptable range of color of the item of laundry is predetermined and stored in a memory 202 associated with the controller 200. The acceptable range of color of the item of laundry may be stored as a range of pixel color values identified within the image of the item of laundry. The controller 200 may further evaluate the at least one image for regions of color discontinuity, for example, to determine streaking or localized staining in the item of laundry. Such evaluation may include calculating a gradient of pixel color values and applying edge detection processing to identify regions of color discontinuity.

Additionally, the controller 200 evaluates the at least one image acquired by the camera 118B to evaluate the condition of the item of laundry. In an example, the controller may apply an image processing algorithm trained with sample images representing various types of damaged laundry. In an example, the training may be specific to a particular type of laundry item to be evaluated (e.g. towels, napkins, pillowcases, or sheets) while in other cases the training data may be generalized across multiple types of laundry or similar types of laundry. The training data may provide examples of fraying, holes, or tears. In examples, these may be used to create models of particular types of damage to which the acquired at least one image is compared, in still further examples, the damage may be further identified using edge detection and identifying discontinuities in the image of the item of laundry.

In a further example, the platforms 112A-C may be constructed or coated in a contrast-promoting material. In examples, the material may be reflective, light (e.g. white), or dark (e.g. brown, blue, red, grey, black), or illuminated, and may depend upon the color and/or physical properties of the item of laundry to be evaluated. Increased contrast between the platform and the item of laundry being imaged may help in identification of damage to the item of laundry. In still further examples, the evaluation zones 116A-C are illuminated with light sources 122. The light sources 122 may for example be arrays of light-emitting diodes (LEDs), but may be other sources of light energy. The light sources 122 may illuminate the evaluation zones 116A-C with white light or may use particular bands of wavelengths of visible (e.g. white, red, green, and/or blue) light or invisible (e.g. ultraviolet or infrared) light energy.

After the evaluation of the item of laundry in the evaluation zone 116B, the motor 114B operates the platform 112B to rotate to or through a dispositive position, as described above with respect to platform 112A. Rotation of the platform 112B to or through the dispositive position drops the item of laundry off of the platform 112B. This may also impart a rotational moment on the item of laundry, which causes the item of laundry to reverse sides and spread out on the platform 112C. Furthermore, an axis of rotation 124B of the platform 112B, along shaft 130B, is exemplarily at a 90° angle to an axis of rotation 124A of the platform 112A, along shaft 130A. In this relationship, the item of laundry is rotated and/or flipped about different coordinate axes respectively by platform 112A and 112B. This may help to ensure that the portions of the item of laundry facing upwards from the platform 112C within the evaluation zone 116C are different than those which were exposed while the item of laundry was in the evaluation zone 116B and/or in the evaluation zone 116A. With the item of laundry resting on the platform 112C, the camera 118C acquires at least one image of the item of laundry. These images are provided to the controller 200 and evaluated in the same manner as described above with respect to the evaluation of the item of laundry in evaluation zone 116B, only to evaluate the opposing side of the item of laundry.

Once the analysis of the at least one image acquired by the camera 118C is complete, the controller 200 makes a final determination of the condition of the item of laundry. The results of the evaluations performed at each of the evaluation zones are combined to determine if the item of laundry is acceptable for customer use or is unacceptable and should be manually evaluated for an alternative use and/or disposed of. In an example, if the item of laundry is outside of an acceptable range of any of the evaluations (weight, color, condition), then the item of laundry fails the evaluation, and the controller 200 provides an operating signal to the motor 114C to move the platform 112C to a disposition position to direct the item of laundry into a receptacle 126 of rejected items of laundry. If the item of laundry is within the acceptable range for all of the evaluations above, then the controller 200 provides an operating signal to the motor 114C to move the platform 112C to a disposition position to direct the item of laundry into a receptacle 128 for acceptable items of laundry. These items of laundry may be gathered for delivery to the customer. While a bin or container is depicted as the receptacle 128, it will be recognized that the receptacle 128 may alternatively be a conveyor or another processing machine, for example, a stacking or folding machine.

Figure 4:
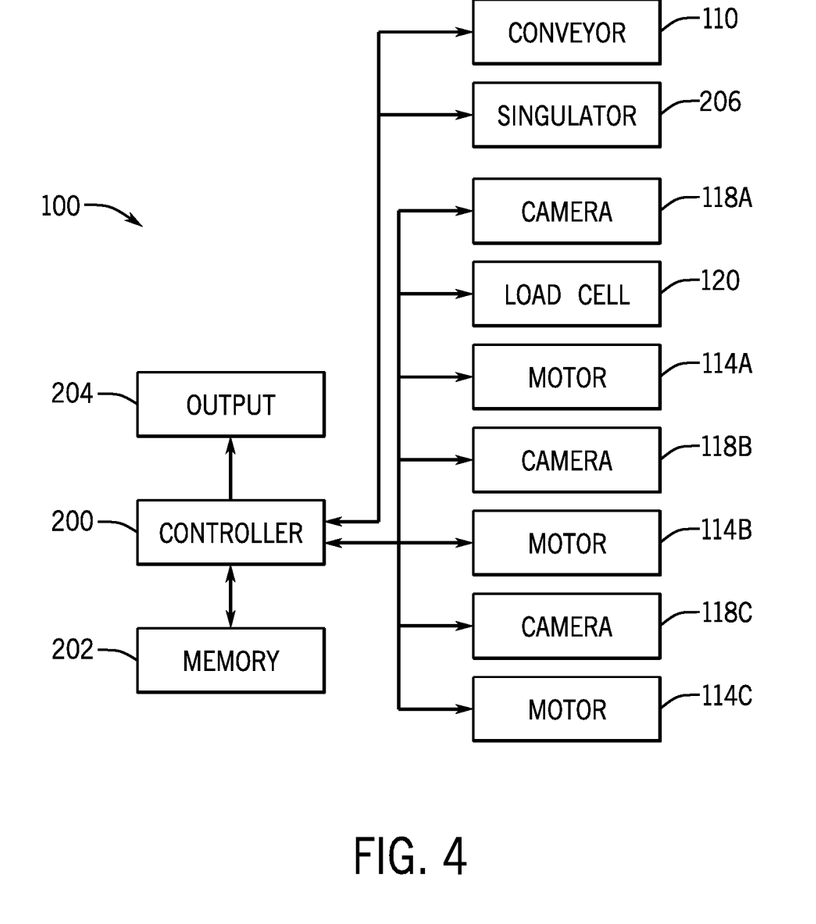
FIG. 4 is a system diagram of an example of the system for sorting and evaluating laundry.

Other variations of the system 100 described above are contemplated. For example, examples of the system 100 that include more or fewer components than those described above are contemplated from the above disclosure. In a further example, the platform 112A, motor 114A, and evaluation zone 116A may be combined with the platform 112B motor 114B, and evaluation zone 116B may be functionally combined into a single platform 112, motor 114, and evaluation zone 116. This may exemplarily be implemented by performing the image processing evaluations describe above with respect to the evaluation zone 116B based upon the images acquired by the camera 118A while the item of laundry is in evaluation zone 116A. In such an example, the system 100 may exemplarily provide the item of laundry direction from evaluation zone 116A to evaluation zone 116C. FIG. 4 is a system diagram of an example of the system 100 for sorting and evaluating laundry. The system 100 includes the controller 200 that is communicatively connected to the components of the system 100, including, but not limited to, the cameras 118A-C, motors 114A-C, and the load cell 120. The controller 200 is further communicatively connected to a memory 202 in the form of a non-transient computer-readable medium upon which the algorithms, models, and evaluation criteria as described above may be stored for access and processing of images received from the cameras 118A-C. As noted above, the controller 200 may be configured to evaluate a particular type of laundry or may identify the type of item of laundry to be evaluated based upon images received from camera 118A. The controller 200 is exemplarily a single board computer (SBC) or a central processing unit (CPU), that includes a processor. The processor of controller 200 may be integral with or communicatively connected to a computer-readable medium upon which computer-readable code is stored. Upon execution of the computer-readable code by the processor, the processor performs functions and calculations and subsequently transmits control signals as previously described. The controller 200 receives the images from the cameras 118A-C and from the load cell 120. In an example, the controller sequentially operates the motors 114A-C from bottom to top along the housing 102 so that each evaluation zone 116A-C is clear to receive a piece of laundry falling from a subsequently higher evaluation zone 116A-C. When the piece of laundry is at the evaluation zone 116C, the controller 200 makes a determination if the piece of laundry has passed the evaluation and provides a control signal to the motor 114C to operate the platform 112C into a dispositive position for laundry items that failed the inspection or to a dispositive position for laundry items that have passed the inspection. This final determination is exemplarily based upon some or all of the measured criteria described above, including the weight, color, and condition of the item of laundry. In still further examples, the controller 200 is communicatively connected to an output device 204. The output device 204 may be a graphical display, visually perceptible LED lights, an audible alarm, or a device that outputs an electronic message or communication to another computing device located remote from the system 100. The controller 200 operates for the output device 204 to present a perceptible message to an operator or other personnel, for example, to indicate that a laundry item has failed the evaluation, that an unexpected laundry item type has been detected in the system, or that no more laundry items have been received at the first evaluation zone 116A.

In the example of the system 100 depicted in FIGS. 1-3, a conveyor 110 operates to advance singulated pieces of laundry to the opening 108 of the housing 102. The controller 200 may further operate to provide control signals to a motor of the conveyor 110 to advance the conveyor 110 in response to a return of the platform 112A to the support position to receive a subsequent item of laundry for evaluation. In still further examples, a robotic singulator 206, as described in further detail herein, may be used within the system 100 to select individual items of laundry and to drop the individual items of laundry through the opening 108 of the housing 102. While the robotic singulator 206 may include one or more of its own controllers, such as to carry out the functions and operations of the robotic singulator 206 as described herein, the controller 200 may communicate with the robotic singulator 206, to coordinate the robotic singulator 206 operation to drop a subsequent item of laundry through the opening 108 once the platform 112A has returned to a support position. Additionally, it will be recognized that examples of the robotic singulator 206 depicted and described herein may also be used in other locations and/or functions of a laundry processing system, for example, but not limited to, selection of individual pieces of dirty laundry or selection and movement of pieces of laundry within a laundry system, for example to transport washed laundry into a mangle for dewatering/drying.

Figure 5:
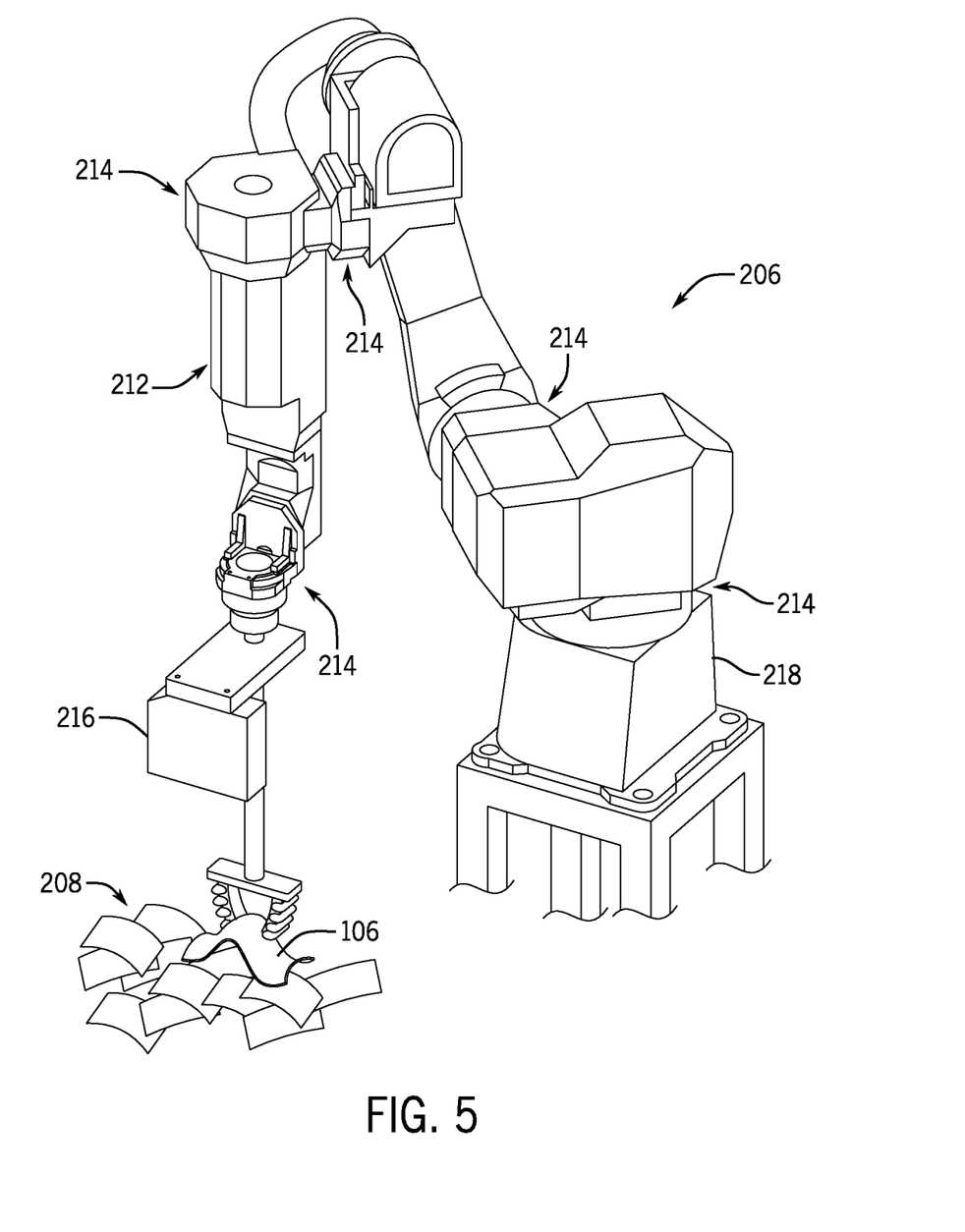
FIG. 5 depicts an example of a robotic singulator.
Figure 6:
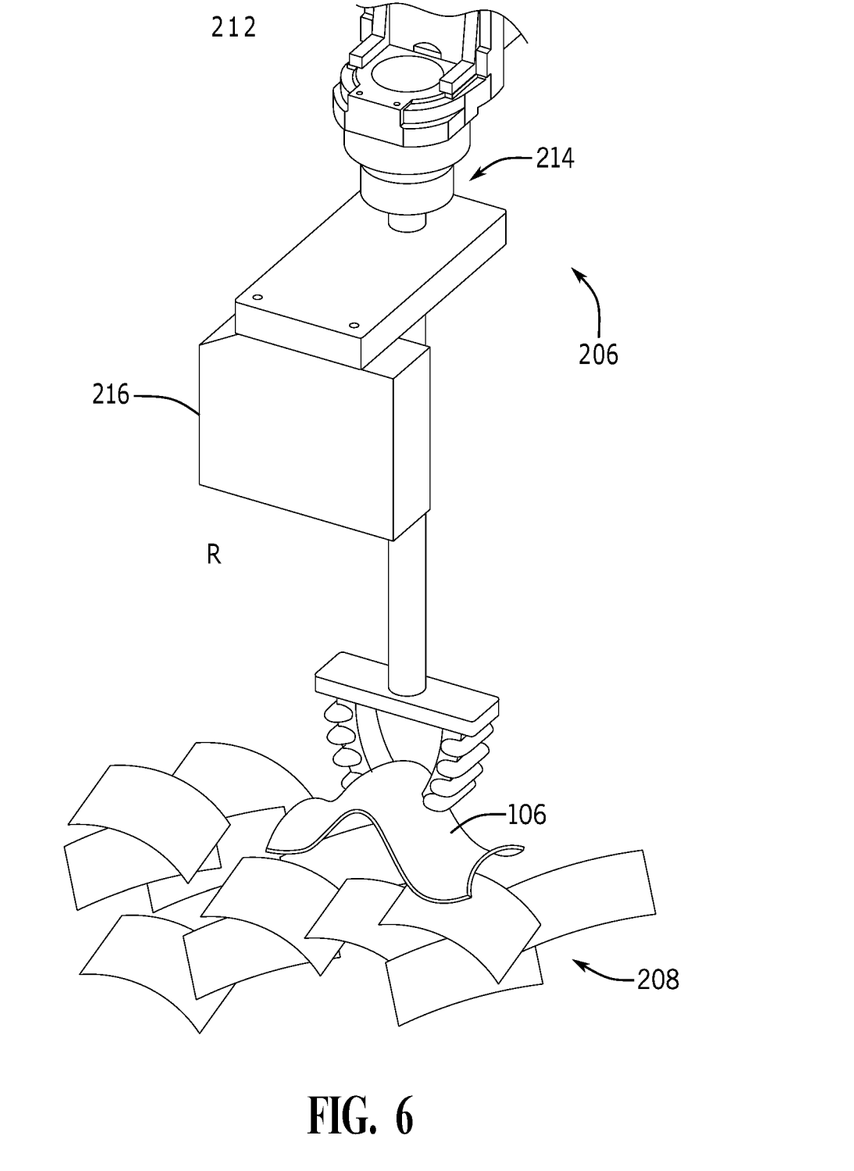
FIG. 6 further depicts the example of a robotic singulator.

FIGS. 5 and 6 depict an example of the robotic singulator 206 as may be used in connection with examples of the system 100. FIG. 5 is an isometric view and FIG. 6 is a close-up detailed view of the robotic singulator 206 grasping an item of laundry 106.

The robotic singulator 206 exemplarily operates to remove a single item of laundry 106 from a pile 208 of items of laundry. The robotic singulator 206 includes an end effector 210 which may be a gripper, as depicted, or may be a suction end effector, although other examples of end effectors 210 may be recognized based upon the present disclosure and are considered to be within the scope of the present disclosure. The robotic singulator 206 includes an arm 212 made up of a plurality of articulating joints 214. The articulating joints may exemplarily include motors, linear actuators, or other mechanics configured to move the portions of the arm 212 about the articulating joints 214. These articulating joints 214 enable the arm 212 to move the end effector 210 into position to grasp a single item of laundry 106 from the pile 208 and to subsequently transport the item of laundry 106 to a next location, for example dropped through opening 108 of the housing 102 or onto the conveyor 110. The robotic singulator 206 further includes a camera 216 and/or computer vision system, for example in combination with a singulator controller 218. While the camera 216 and the controller 218 are exemplarily depicted as physically connected to the arm 212, in other examples, the camera(s) 216 may be located at a fixed locations(s) relative to the pile 208 and the arm 212. In other examples, the singulator controller 218 may be communicatively connected to the In an example, the singulator controller 218 is the same as the controller 200 described above, although in other examples, the controller 200 and controller 218 are separate components but may be communicatively connected for coordination of the robotic singulator 206 within the system 100. The camera 216 is exemplarily an iRVision 3D system with a 3DV Sensor available from FANUC America Corp. of Rochester Hills, Michigan, USA, and the associated software and firmware used to operate this camera system and to provide analysis of the images captured thereby.

The camera 216 is mounted either at a fixed relationship to the end effector 210 of the arm 212 or is mounted to a fixed location relative to a loading zone (e.g. the pile of laundry 208). Laundry in the pile of laundry 208 may exemplarily be clean laundry, and may exemplarily be provided on a table, bin, or a horizontal or angled conveyor. The computer vision system (e.g a combination of the camera 216 and the controller 218 communicatively connected to the camera 216) exemplarily creates a point-cloud of the pile of laundry 208. The controller 218 is associated with the camera/computer vision system and the robotic arm identifies a peak of the point-cloud.

In an example, the computer system identifies a single peak in the point-cloud. In an example, the peak of the point-cloud is identified as the geometrically closest point of the point-cloud to a reference point R, for example within a 3D coordinate system. The reference point may exemplarily be a point R above the surface of the loading zone, a portion of the camera 216, or another point of reference. The controller 218 provides coordinate instructions to the robotic arm 212 to move the end effector 210 for example within the 3D coordinate system to the identified peak in the point-cloud. The end effector 210 is operated to close on the peak or at a predetermined position relative to the identified peak. This has been found by the inventors to reliably select a single piece of laundry from a pile of laundry. It will be recognized that while a 3D coordinate system has been described, that other coordinate systems may be used while remaining within the scope of the present disclosure.

Once the piece of laundry is gripped by the end effector 210 of the robotic arm 212, the robotic arm 212 moves the single piece of laundry 106 to a destination location. While other examples are also contemplated, the robotic arm 212 may deliver the single piece of laundry 106 to the opening 108 of the laundry evaluation system 100 as described above. In such an example, the robotic arm 212 lifts the piece of laundry to the top of the system 100 above the opening 108, for example, represented by a 3D coordinate, and releases the piece of laundry to fall through the opening 108 for evaluation as described above. After the piece of laundry is released, the robotic arm 212 is operated by the controller 218 to return the end effector 210 to the loading zone to identify a subsequent peak of the point cloud and a subsequent piece of laundry.

It will be recognized that the example provided above is merely exemplary and provided to support disclosure while recognizing that the singulator depicted therein may be modified in function, design, or operation for use in conjunction with the optical evaluation system described above or as another component within an automated or semi-automated laundry system. In an example, the conveyor 110 may be used in combination with the robotic singulator 206 with the conveyor 110 advancing a pile of laundry to the loading zone of the robotic singulator 206, the laundry is singulated as described herein, until the pile of laundry has been depleted, then the conveyor advances a subsequent pile of laundry to the loading zone.

In a further example, rather than delivering the piece of laundry to the optical evaluation system 100 as described above, the singulator may deliver the piece of laundry to a flattening table (not depicted) which, for example, is a vibratory table that uses vibration to flatten the piece of laundry. In a still further example, the flattened piece of laundry may be moved into a mangle or automatedly folded.

In other examples, an optical system, similar to that as previously described may use one or more cameras to evaluate a quality or condition of the piece of laundry. The piece of laundry may be sorted off of this flattening table based upon the evaluation of the quality or condition of the piece of laundry.

The systems and methods described above have been done so with respect to the evaluation and sorting of clean laundry. It will be recognized that applications may exist in which such systems and methods may be used in the processing and/or sorting of dirty laundry or elsewhere intermediate to a laundry cleaning process.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A laundry sorting and evaluation system, the system comprising:
    a housing having an opening and defining a laundry path;
    a first platform within the housing, the first platform operably connected to a first motor, the first motor configured to move the first platform between a supportive position and at least one dispositive position;
    a first camera associated with the first platform and configured to acquire at least one first image of an item of laundry on the first platform in the supportive position;

a second platform within the housing, the second platform below the first platform, the second platform operably connected to a second motor, the second motor configured to move the second platform between a supportive position and at least one dispositive position;

a second camera associated with the second platform and configured to acquire at least one second image of the item of laundry on the second platform in the supportive position; and a controller configured to receive the at least one image from the first camera and the at least one image from the second camera and to produce an evaluation of a condition of the item of laundry based upon the at least one first image and the at least one second image.

2. The laundry sorting and evaluation system of claim 1, wherein the at least one dispositive position of the second platform comprises a first dispositive position and a second dispositive position, and wherein the controller operates the second motor to move the second platform into the first dispositive position or the second dispositive position based upon the evaluation of the condition of the item of laundry.

3. The laundry sorting and evaluation system of claim 2, wherein the controller is configured to receive the at least one first image and the at least one second image and to produce the evaluation of the condition of the laundry based upon the at least one first image and the at least one second image wherein if the evaluation is an acceptable condition, the controller is configured to operate the second motor to move the second platform to the first dispositive position and if the evaluation is an unacceptable condition, and the controller is configured to operate the second motor to move the second platform to the second dispositive position.

4. The laundry sorting and evaluation system of claim 3, wherein the controller is configured to produce a user-perceptible output of the evaluation of the condition of the item of laundry.

5. The laundry sorting and evaluation system of claim 3, wherein the first platform comprises a load cell, the load cell configured to measure a weight the item of laundry on the first platform in the supportive position, and the controller is configured to receive the weight from the load cell and the evaluation of a condition of the item of laundry by the controller is further based upon the weight.

6. The laundry sorting and evaluation system of claim 3, wherein:

the first platform is configured to receive the item of laundry in the supportive position, and after the controller receives the at least one first image, the controller is configured to operate the first motor to move the first platform to the at least one dispositive position configured for the item of laundry to fall from the first platform in the at least one dispositive position to the second platform in the supportive position; and the second platform is configured to receive the item of laundry in the supportive position, and after the controller receives the at least one second image, the controller is configured to operate the second motor to move the second platform to the first dispositive position or the second dispositive position.

7. The laundry sorting and evaluation system of claim 6, wherein movement of the first platform from the supportive position to the at least one dispositive position is configured to flip the item of laundry over before landing on the second platform in the supportive position.

8. The laundry sorting and evaluation system of claim 3, further comprising:

a robotic singulator configured to grasp the item of laundry and to drop the item of laundry through the opening of the housing or onto a conveyor configured to drop the item of laundry through the opening of the housing.

9. The laundry sorting and evaluation system of claim 8, wherein the robotic singulator further comprises:

an end effector configured to grasp the item of laundry;

a singulator camera positioned in proximity to the end effector and configured to obtain at least one laundry image; and a singulator controller configured to receive the at least one laundry image, create a point-cloud from the at least one image, select a peak of the point-cloud in reference to a reference point, and control the end effector to the peak of the point-cloud to grasp the item of laundry.

10. The laundry sorting and evaluation system of claim 3, further comprising:

at least one first light source positioned relative to the first platform and configured to illuminate the item of laundry when on the first platform in the supportive position; and at least one second light source positioned relative to the second platform and configured to illuminate the item of laundry when on the second platform in the supportive position.

11. The laundry sorting and evaluation system of claim 1, wherein at least one of the first platform and the second platform comprises a material configured to contrast with the item of laundry.

12. The laundry sorting and evaluation system of claim 1, further comprising:

a third platform within the housing and located between the first platform and the second platform, the third platform operably connected to a third motor, the third motor configured to move the third platform between a supportive position and at least one dispositive position; and a third camera associated with the second platform and configured to acquire at least one third image of the item of laundry on the third platform in the supportive position;

wherein the evaluation of a condition of the item of laundry is further based upon the at least one third image.

13. A system for evaluating and sorting an item of laundry, the system comprising:

a housing having an opening and defining a laundry path;

a load cell within the housing configured to weigh the item of laundry;

a first platform within the housing, the first platform operably connected to a first motor, the first motor configured to move the first platform between a supportive position and at least one dispositive position;

a first camera associated with the first platform and configured to acquire at least one first image of an item of laundry on the first platform in the supportive position;

a second platform within the housing, the second platform below the first platform, the second platform operably connected to a second motor, the second motor configured to move the second platform between a supportive position and at least one dispositive position;

a second camera associated with the second platform and configured to acquire at least one second image of the item of laundry on the second platform in the supportive position; and a controller configured to receive the at least one first image from the first camera, the at least one second image from the second camera, and a weight from the load cell, the controller configured to produce an evaluation of the condition of the laundry based upon the at least one first image, the at least one second image, and the weight wherein if the evaluation is an acceptable condition, the controller is configured to operate the second motor to move the second platform to a first dispositive position, and if the evaluation is an unacceptable condition, the controller is configured to operate the second motor to move the second platform to a second dispositive position.

14. The system of claim 13, wherein the controller is configured to identify the item of laundry from the at least one first image.

15. The system of claim 13, wherein the controller is configured to evaluate the at least one second image for color or discontinuity to evaluate the condition of the item of laundry.

16. The system of claim 13, further comprising:
a third platform within the housing and located between the first platform and the second platform, the third platform operably connected to a third motor, the third motor configured to move the third platform between a supportive position and at least one dispositive position; and
a third camera associated with the second platform and configured to acquire at least one third image of the item of laundry on the third platform in the supportive position;
wherein the evaluation of a condition of the item of laundry is further based upon the at least one third image.

17. The system of claim 16, wherein an axis of rotation of the third platform is perpendicular to an axis of rotation of the first platform; and
wherein movement of the first platform to the at least one dispositive position is configured to cause the item of laundry to flip over while falling from the first platform to the third platform in the supportive position, and movement of the third platform to the at least one dispositive position is configured to cause the item of laundry to flip over while falling from the third platform to the second platform in the supportive position.

18. The system of claim 17, wherein the controller is configured to identify a laundry type from the at least one first image, the controller is configured to evaluate the at least one third image for color or discontinuity based upon the identified laundry type, and the controller is configured to evaluate the at least one second image for color or discontinuity based upon the identified laundry type.

19. The system of claim 13, further comprising a singulator that operates to provide the item of laundry through the opening into the housing.

20. The system of claim 19, wherein the singulator is a robotic singulator, the robotic singulator comprising:
an articulable robotic arm;
an end effector at the end of the articulable robotic arm, the end effector configured to grasp the item of laundry;
a singulator camera positioned in proximity to the end effector and configured to obtain at least one laundry image; and
a singulator controller configured to receive the at least one laundry image, create a point-cloud from the at least one image, select a peak of the point-cloud in reference to a reference point, and control the end effector to the peak of the point-cloud to grasp the item of laundry.

* * * * *